United States Patent
Rogerson et al.

(10) Patent No.: US 7,644,363 B2
(45) Date of Patent: Jan. 5, 2010

(54) "FOR-EACH" LABEL COMPONENTS IN CAD DRAWINGS (75) Inventors: Michael C. Rogerson, Manchester, NH (US); Gary Blais, Hopkinton, NH (US); Kenneth W. Spalding, III, Mont Vernon, NH (US); Patrick Haessly, Virginia Beach, VA (US); Lisa Fox, Sandown, NH (US); Michael A. Appolo, III, Derry, NH (US)

(73) Assignee: Autodesk, Inc., San Rafael, CA (US)

( * ) Notice: Subject to any disclaimer, the term of this patent is extended or adjusted under 35 U.S.C. 154(b) by 181 days.

(21) Appl. No.: 11/279,216

(22) Filed: Apr. 10, 2006

(65) Prior Publication Data
US 2007/0240049 A1 Oct. 11, 2007

(51) Int. Cl.
*G06F 3/048* (2006.01)

(52) U.S. Cl. .................. 715/715; 715/964; 715/808; 715/735; 700/182

(58) Field of Classification Search .................. 715/964, 715/968, 700, 763, 715, 735, 764, 771, 808, 715/825; 700/98, 182
See application file for complete search history.

(56) References Cited

U.S. PATENT DOCUMENTS

| 4,992,953 | A | 2/1991 | Yoshida et al. | |
|---|---|---|---|---|
| 5,006,991 | A | 4/1991 | Ohcoshi et al. | |
| 5,062,068 | A | 10/1991 | Kondo et al. | |
| 5,571,428 | A | 11/1996 | Nishimura et al. | |
| 5,740,341 | A | 4/1998 | Oota et al. | |
| 5,745,751 | A * | 4/1998 | Nelson et al. | 707/102 |
| 5,768,149 | A | 6/1998 | Umney et al. | |
| 5,774,372 | A | 6/1998 | Berwanger | |
| 6,611,725 | B1 * | 8/2003 | Harrison et al. | 700/98 |
| 6,662,144 | B1 | 12/2003 | Normann et al. | |
| 6,701,288 | B1 | 3/2004 | Normann et al. | |
| 6,757,567 | B2 * | 6/2004 | Campagnolo et al. | 700/2 |
| 6,757,576 | B2 * | 6/2004 | Greer et al. | 700/97 |
| 6,778,871 | B2 * | 8/2004 | Holman et al. | 700/98 |
| 6,904,392 | B1 | 6/2005 | Marty et al. | |
| 2002/0029134 | A1 | 3/2002 | Friedrich et al. | |
| 2002/0107673 | A1 | 8/2002 | Haller et al. | |
| 2003/0036889 | A1 | 2/2003 | Goodman et al. | |
| 2003/0061011 | A1 | 3/2003 | Hoeft | |
| 2004/0075688 | A1 * | 4/2004 | Cortesi et al. | 345/763 |
| 2004/0225392 | A1 | 11/2004 | Greer et al. | |
| 2005/0172260 | A1 | 8/2005 | Eichstaedt et al. | |
| 2005/0188332 | A1 * | 8/2005 | Kolman | 715/822 |
| 2005/0285855 | A1 | 12/2005 | Chien et al. | |
| 2006/0052989 | A1 | 3/2006 | Berwanger | |
| 2007/0013709 | A1 * | 1/2007 | Charles et al. | 345/581 |

\* cited by examiner

*Primary Examiner*—Ba Huynh
*Assistant Examiner*—Phenuel S Salomon
(74) *Attorney, Agent, or Firm*—Patterson & Sheridan, LLP (57) ABSTRACT

Embodiments of the invention provide a method for generating labels for drawing elements of a computer aided design (CAD) drawing that may include some unknown number of associated or related drawing elements. The method includes receiving a selection of a set of drawing elements in the CAD drawing that are associated with the first drawing element, receiving a selection of fields specifying attributes of the drawing elements in the set of drawing elements to use in generating label content for a label of the first drawing element, and defining a label style based on the selection of the set of drawing elements and the selection of attributes of the of the drawing elements in the set of drawing elements.

20 Claims, 6 Drawing Sheets

"FOR-EACH" LABEL COMPONENTS IN CAD DRAWINGS

BACKGROUND OF THE INVENTION

1. Field of the Invention

The present invention generally relates to computer-aided design and, more specifically, to a system and method for generating for-each label components to label elements in a computer-aided design (CAD) drawing.

2. Description of the Related Art

The term computer-aided design (CAD) generally refers to a broad variety of computer-based tools used by architects, engineers, and other construction and design professionals. CAD applications may be used to construct computer models representing virtually any real-world construct. For example, computer-aided design (CAD) applications are frequently used to compose graphical representations of civil engineering constructs such as utility networks. Using a CAD application, a user may compose a CAD drawing by selecting drawing elements and positioning them within the drawing. Typically, drawing elements are provided to represent elements of the object being modeled. In the case of a utility network, drawing elements may represent segments of pipes, and structures such as manholes, catch basins, grates, headwalls, etc.

Additionally, CAD drawings may be used to convey architectural, construction, engineering, and other information related to the object modeled by a CAD drawing. Often, this information is provided in the form of labels associated with of elements in a CAD drawing. For example, a segment of pipe may include a label indicating the length and diameter of the pipe. More complex labels may indicate pipe material or even information such as an intended supplier cost, or tolerances of the pipe. Other elements in a drawing may also have labels appropriate for their individual element types. Such labels may be generated and displayed on screen and also included in construction or engineering documentation generated from a CAD drawing.

Given the usefulness of these kinds of labels, CAD applications often allow users to define a label style to use for a particular drawing element. Thereafter, any instances of that element in a CAD drawing may have a label generated according to the style. Further, if the properties of a drawing element change (e.g., a pipe is made longer), the label may be updated accordingly. This technique works well for labeling drawing elements with a fixed set of fields (e.g., the length and diameter of a drawing element representing a segment of pipe). However, as drawing elements become more complex, labeling systems that create labels by populating a fixed number of fields prove to be inadequate. For example, a drawing element representing a manhole structure (i.e., a concrete underground box) may have some number of pipes attached to it. The exact number may depend on the use of the manhole structure in a particular CAD drawing. Generating a label style for this type of structure cannot be done using the general process described above, as the number of pipe elements connected to the manhole structure is not known in advance.

One approach to creating labels for complex drawing elements is for users to create labels without relying on a label style. In such an approach, a user may inspect a CAD drawing to identify a set of drawing elements that are associated or related with a drawing element being labeled (e.g., a manhole structure), and then manually compose a label that includes data regarding each associated drawing element. If the drawing element is modified, a label of that element must be updated by hand as well. In addition to being tedious, this approach may lead to inaccurate labeling, because users may neglect to update a label after modifying elements of a CAD drawing.

Accordingly, there remains a need in the art for techniques to define, generate and display dynamic labels for elements in a CAD drawing that may include some unknown number of associated or related drawing elements.

SUMMARY OF THE INVENTION

Embodiments of the invention provide a method for labeling drawing elements in a CAD drawing that have some number of connected or related drawing elements. A CAD application may be used to define a for-each label component that is used to specify label content for each connected element actually associated with that drawing element in the CAD drawing. For example, some structures in a utility network, such as a manhole, may include some number of connected pipe elements. To generate a label for such drawing element representing such a structure, the for-each label component specifies what data to include in the label for each pipe element actually connected to the structure.

Additionally, when defining a label style that includes a for-each label component, users may be prompted to specify the set of related or associated components to include in the label. For example, a label component for a manhole structure may specify to include a line of text for each connected pipe. Alternatively, a user may specify a selected subset (e.g., all inlet (or outlet) pipes connected to a manhole structure). Further, a label style may include multiple for-each components, such as one for-each label component for all inlet pipes and a different for-each label component for all out-flow pipes. In other words—a condition or property related to a drawing element(s) may be used to determine which for-each label component should be used to generate a label for the drawing element, or even whether to include information related to the drawing element in a label at all.

One embodiment includes a method for defining a label style for a drawing element. Generally, the method includes receiving a selection of a set of drawing elements in the CAD drawing that are associated with the first drawing element, receiving a selection of attributes of the drawing elements in the set of drawing elements to use in generating label content for a label of the first drawing element, and defining a label style based on the selection of the set of drawing elements and the selection of attributes of the of the drawing elements in the set of drawing elements.

Once defined, the for-each label component may be used to generate a label for a drawing element in a CAD drawing. Generating a label for such a drawing element may include generating label content for each drawing element in the set of drawing elements, according to the selection of fields specified by the label style; and displaying the label content in the CAD drawing in a label associated with the first drawing element.

When an element connected to a structure is modified, or if additional pipes are connected to the structure, the label may be updated without the user having to rewrite the label.

DETAILED DESCRIPTION OF THE PREFERRED EMBODIMENTS

Embodiments of the invention provide a method for generating labels for elements of a CAD drawing that may include some number of connected or related drawing elements. As used herein, a "label" generally refers to a display of information related to an element in a CAD drawing. In other words, labels may be used to provide metadata about drawing elements. For example, labels may display information related to the properties of a drawing element, such as the size, length, or type of the element. Usually, labels are not part of a model; but rather convey useful information about the model.

In one embodiment, users may define a label style using a set of label components. As described herein, a "for-each" label component may be used to define a label style which, when applied to a drawing element, displays information in a label for each instance of the "for each" part as specified by the label style. Doing so allows users to define label styles for drawing elements that may have some unknown number of related or connected components.

Additionally, 2D and 3D views may be generated that include a display representation of an object being modeled, along with any labels, including various, plan, profile, and section views. Also, embodiments of the invention are described herein being used to model a surface water utility network using structure parts such as manholes, catch basins, and storm sewers connected by pipe parts. However, the invention is not limited to this type of utility network and may be extended to other utility networks. Accordingly, the invention may be adapted to define label styles with for-each label components for other utility networks such as telecommunications networks, pipeline networks, power grid networks, etc.

Further, the invention may be used to define for-each label components for a variety of different drawing elements in a CAD drawing. For example, a for-each label component may be defined for a drawing element representing part of a triangular irregular network (TIN) surface. Any given point in such a surface can be connected to N number of other points by "TIN" lines. One could define a label style for such a point that includes a for-each label component specifying information about each point at the other end of the connected TIN lines to include in a label. Another example includes a drawing element representing a real-property boundary (e.g. a property corner). One could define a label style for the property corner that includes a for-each label component. Such a component could specify what information to include in a label for each property line connected to the parcel, as well as information related to property corners at the other end of the connected property lines.

Figure 1:
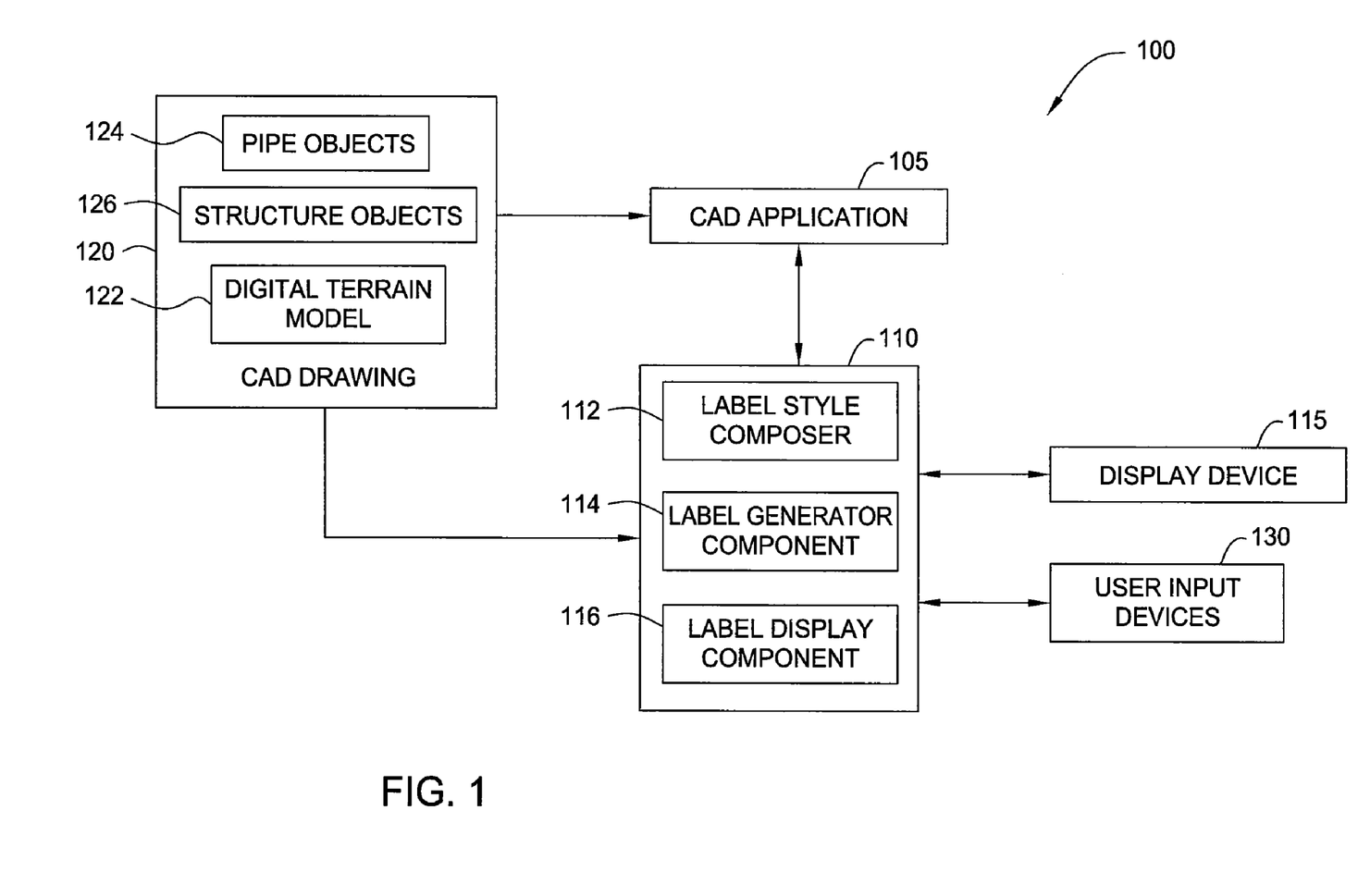
FIG. 1 is a block diagram illustrating a system used to compose a CAD drawing, according to one embodiment of the invention.

FIG. 1 is a block diagram illustrating a system 100 used to compose a CAD drawing 120, according to one embodiment of the invention. The components illustrated in system 100 include computer software applications that may be executed on existing computer systems, e.g., desktop computers, server computers, laptop computers, tablet computers, and the like. The software applications described herein, however, are not limited to any particular computing system and may be adapted to take advantage of new computing systems as they become available.

Additionally, the components illustrated in system 100 may be software applications executing on distributed systems communicating over computer networks including local area networks or large, wide area networks, such as the Internet. For example, a graphical user interface 110 may include a software program executing on a client computer system communicating with a CAD application 105 executing on a server computer system. Also, embodiments of the invention may be provided as an application program (or programs) stored on computer readable media such as a CD-ROM, DVD-ROM, flash memory module, or other tangible storage media.

As shown, the system 100 includes, without limitation, CAD application 105, graphical user interface 110, CAD drawing 120, user input devices 130, and a display device 115. In one embodiment, CAD application 105 is a software application configured to allow a user interacting with GUI interface 110 to generate CAD drawing 120. Accordingly, CAD application 105 includes routines or instructions that allow users to create, edit, and save CAD drawing 120. Preferably, the Civil 3D® application program and associated utilities available from Autodesk®, Inc. may be used. Users may interact with GUI interface 110 to create, view, and modify aspects of CAD drawing 120, including generating and displaying labels for elements in CAD drawing 120. Data related to label styles may be stored in CAD drawing 120. Typically, user input devices 130 include a mouse pointing device and a keyboard, and display device 115 is a CRT monitor or LCD display.

In one embodiment, GUI interface 110 may include components used to define a for-each label component as part of a label style. As shown, GUI interface 110 includes a label style composer 112, label generation component 114, and label display component 116. Those, skilled in the art will recognize, however, that the tools of GUI interface 110 shown in FIG. 1 are simplified to highlight aspects of the present invention and that CAD application 105 and GUI interface 110 typically provide a broad variety of additional tools and features used to compose a CAD drawing 120.

Label style composer 112 allows the user to define label styles for different elements in a CAD drawing 120. As described in greater detail herein, CAD application 105 may be configured to allow users to define a for-each label component for a drawing element that may have some number of connected or related elements. Label generation component 114 may be configured to generate labels for the drawing elements actually present in a particular CAD drawing. Label display component 116 may be configured to display labels for elements present in CAD drawing 120. For example, labels may be shown on display device 115 or in engineering and construction documentation generated from CAD drawing 120.

In one embodiment, CAD drawing 120 includes a digital terrain model 122 pipe objects 124, and structure objects 126. Digital terrain model 122 represents a virtual three-dimensional space for composing a model of utility network. Typically, digital terrain model 122 provides a representation of the geography and terrain present at some real-world location. Digital terrain model 122 may include terrain geometry representing sections of both ground surfaces and sub-surfaces.

Generally, a utility network modeled by CAD drawing 120 may be composed from pipe objects 124 and structure objects 126. Pipe objects 124 are typically used to connect structure objects. For example, a pipe object may connect two structure objects 126 or may connect elements of a single structure. Structure objects 126 represent the engineering or structural components of a utility network. For example, common structures of a surface water utility network include manholes, catch basins, headwalls, end sections, covers, grates, gutters, storm drains and the like. Additionally, as used in a particular CAD drawing, a structure object 126 may have any number of connected elements leading in and/or out of that structure object 126. For example, a structure object 126 representing a manhole may be connected to any number of inlet and outlet pipes objects 124. Of course, depending on the object being modeled in CAD drawing 120, different types of structure objects 126 and pipe objects 124 may be provided.

Figure 2:
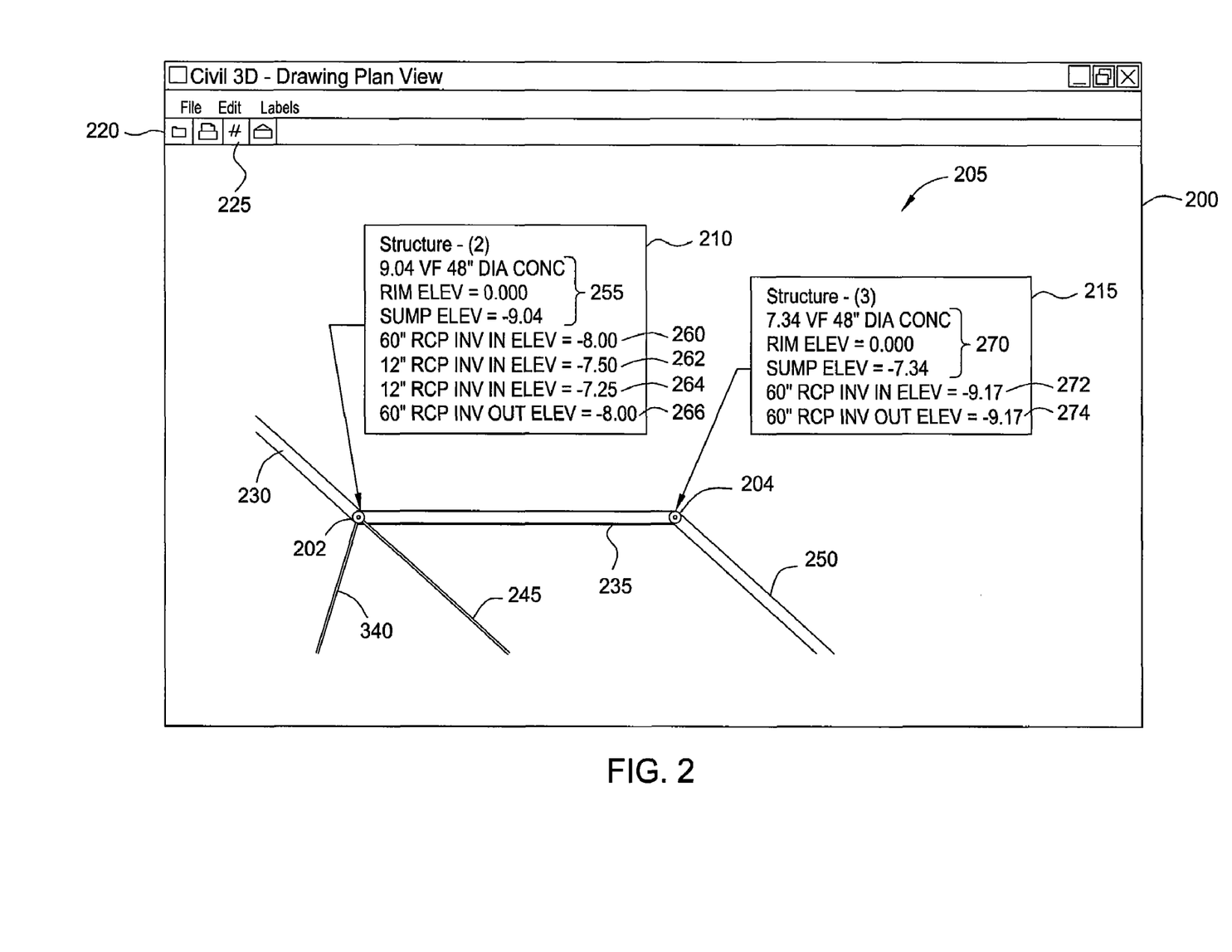
FIG. 2 is a block diagram illustrating a CAD drawing in a plan view, according to one embodiment of the invention.
Figure 4:
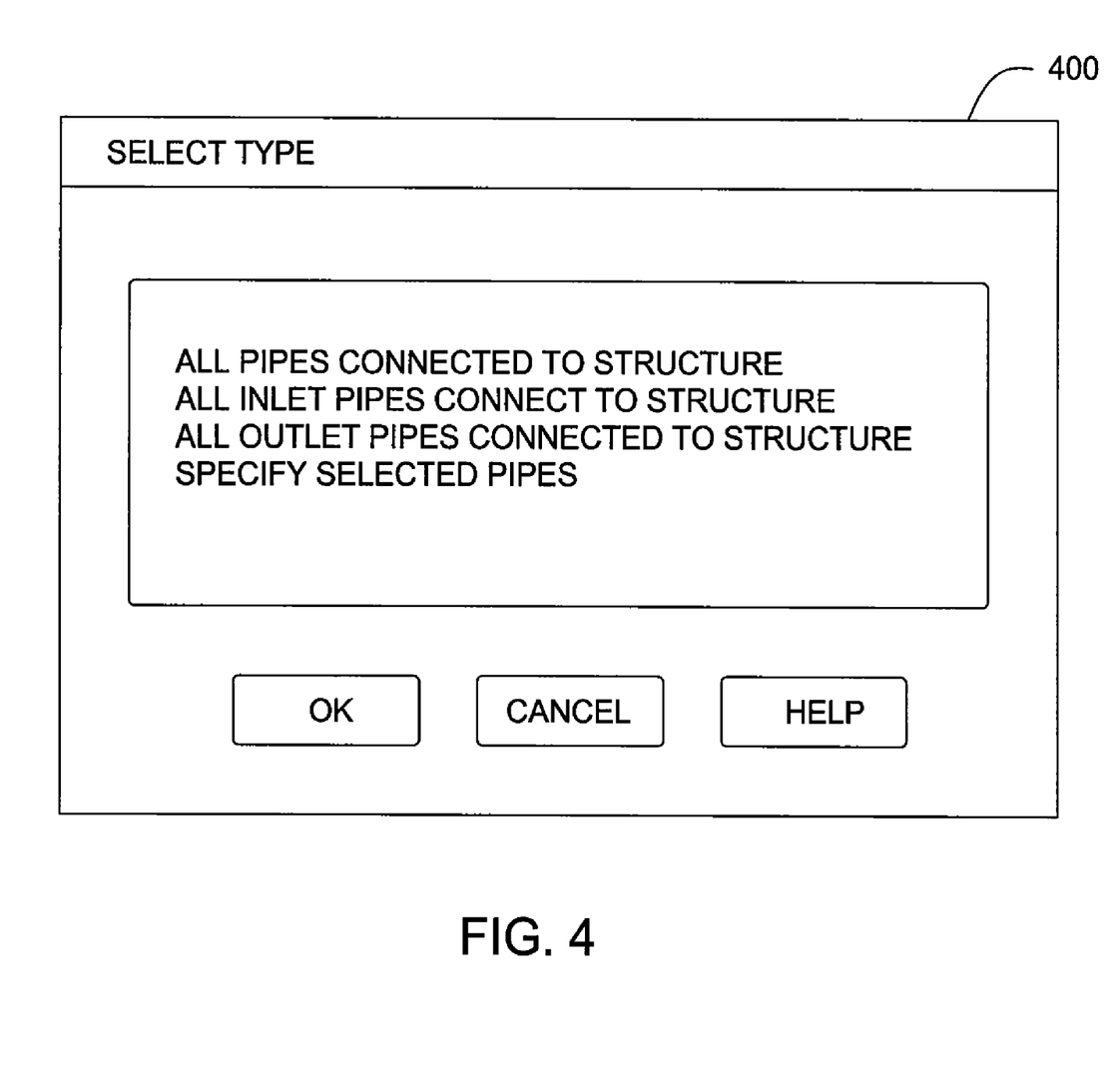
FIG. 4 illustrates a dialog box displaying a set of selection choices for a for-each label component, according to one embodiment of the invention.
Figure 5:
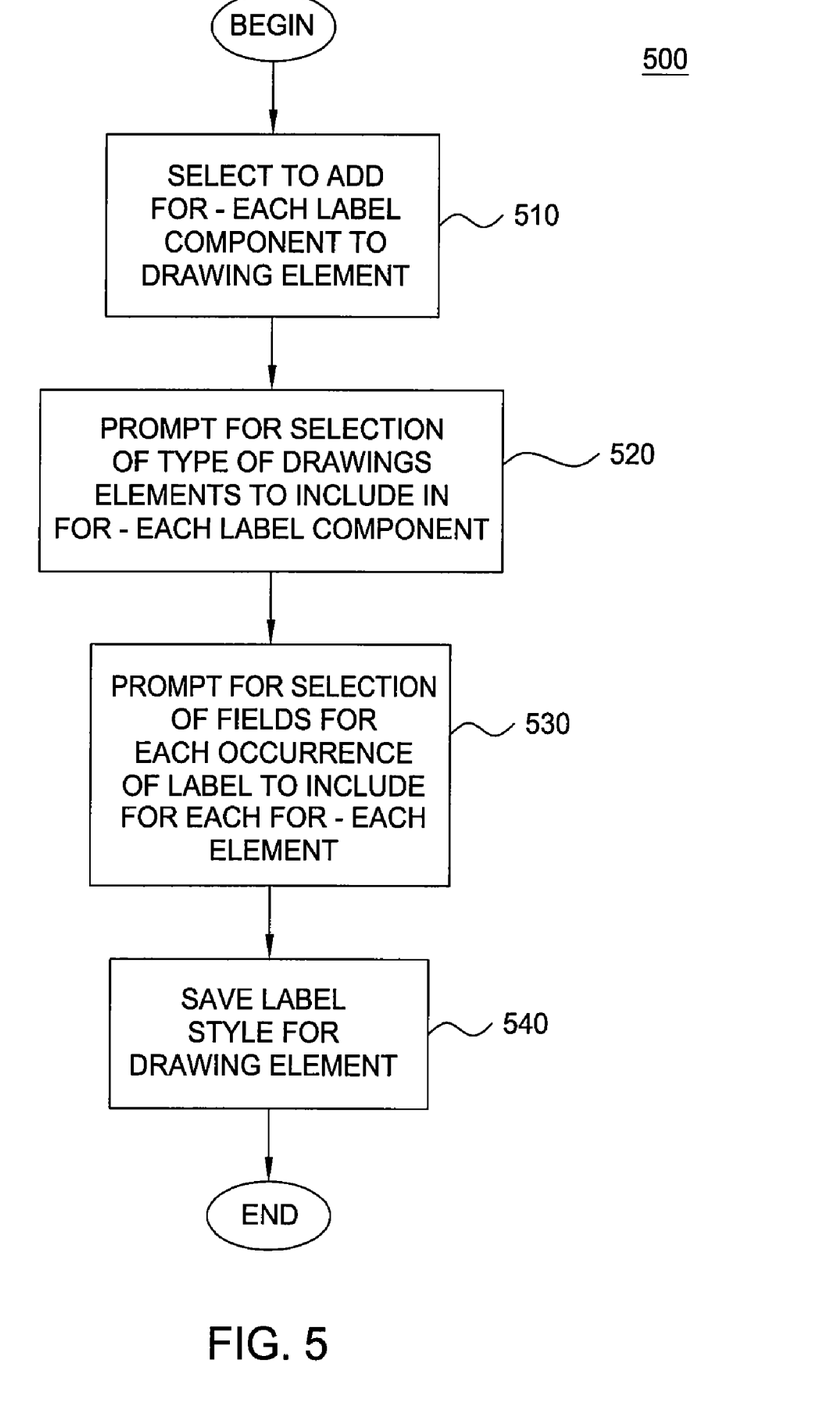
FIG. 5 illustrates a method for defining a for-each label component of a label style, according to one embodiment of the invention.
Figure 6:
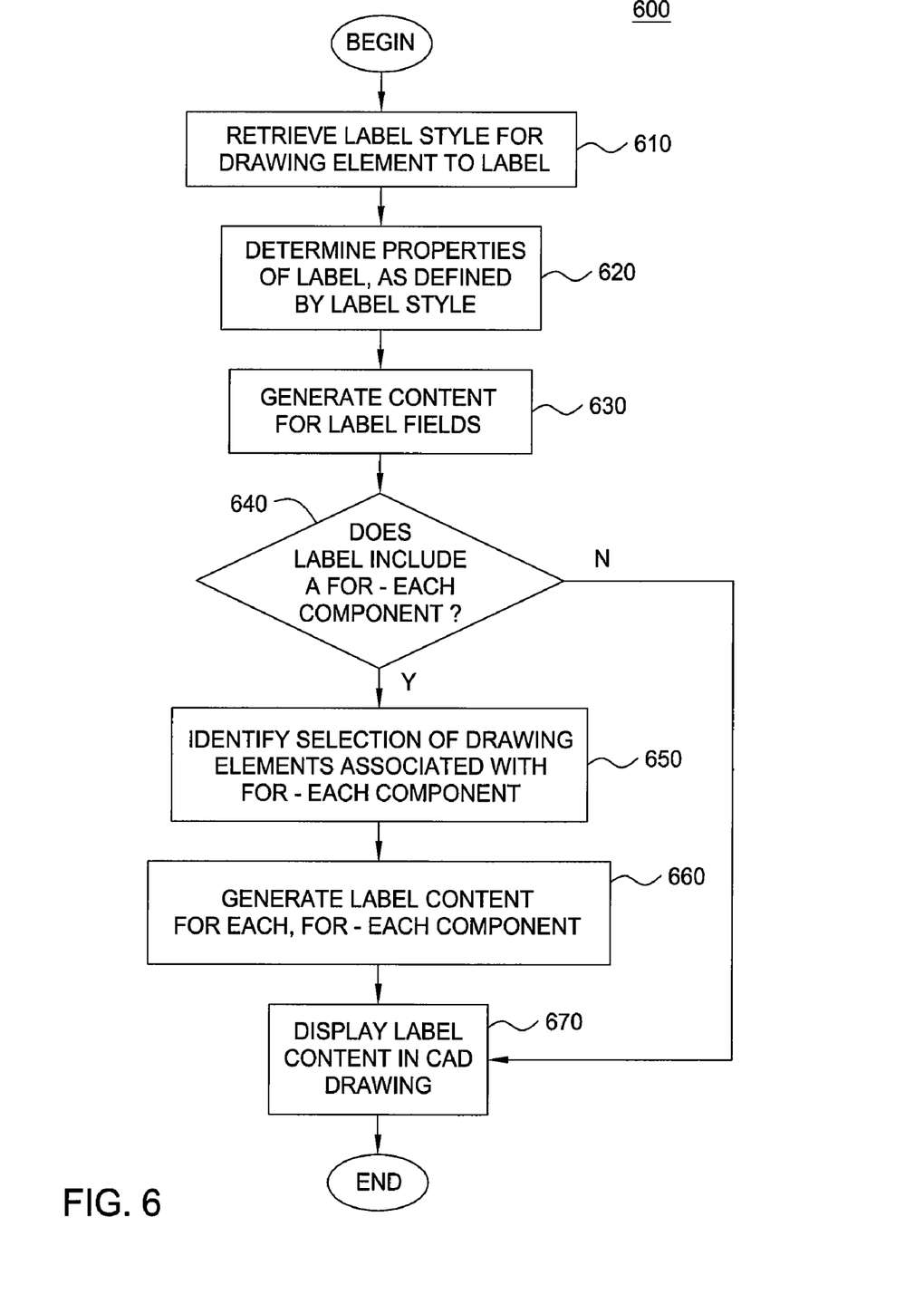
FIG. 6 illustrates a method for generating a label for an element in a CAD drawing that includes a for-each label component, according to one embodiment of the invention.

FIG. 2 illustrates a CAD drawing of a utility network that includes a number of pipe objects 124, structure objects 126, and also illustrates labels 210 and 215 generated from a label style that includes a for-each label component. FIGS. 4-6 illustrate an embodiment of the invention used to define, generate, and display labels 210 and 215 as illustrated in this figure.

As shown, view area 200 displays a CAD drawing of a utility network 205. Utility network 205 includes two structure objects 202 and 204 connected to a plurality of pipe objects. Specifically, structure object 202 is connected to pipe objects 230, 235, 340, and 245. Structure object 204 is also connected to pipe object 235 as well as to pipe object 250. In addition to the drawing elements of utility network 205, view area 200 also displays labels 210 and 215. In this example, label 210 is associated with structure 202, and label 215 is associated with structure 204. Label 210 includes label components 255 showing data related to structure 202. Labels 205 and 210 include data related to structure name, a size, and a rim and sump elevation. In addition, label 210 includes a for-each label component that displays information related to the four pipe objects connected to structure 202. Specifically, lines 260, 262, 264, and 266 correspond to pipe objects 235, 240, 245, and 230, respectively. Each line of the for-each label component provides data related to one of the connected pipe objects. For example, for-each label component 260 indicates that pipe 230 is a 60" reinforced concrete pipe (RCP), flowing into structure object 202 with an elevation of −8.00.

Similarly, label 215 includes label components 270 showing data related to structure 204. Label 215 also includes a for-each label component showing data related to connected pipes 235 and 250. Note, because pipe 235 is connected to both structure objects 202 and 204, labels 210 and 215 each include a line for this pipe object. Labels 210 and 215 may be responsive to changes made to CAD drawing shown in FIG. 2. As the properties of the CAD drawing change (e.g., additional elements are added or removed or the properties of existing elements are modified), a label generation component 116 may be configured to update the content of these labels.

FIG. 2 also shows menu bar 220 that allows users interact with graphical user interface 110 by selecting menu items such as the "Label" menu item 207. In one embodiment, a menu item such as this may be used to display label style composer 112. Alternatively (or additionally), embodiments of the invention may include a command line interface, keyboard shortcut keys, or other graphical tools such as a button that allows users display the label style composer 112 (e.g., button 225).

Figure 3:
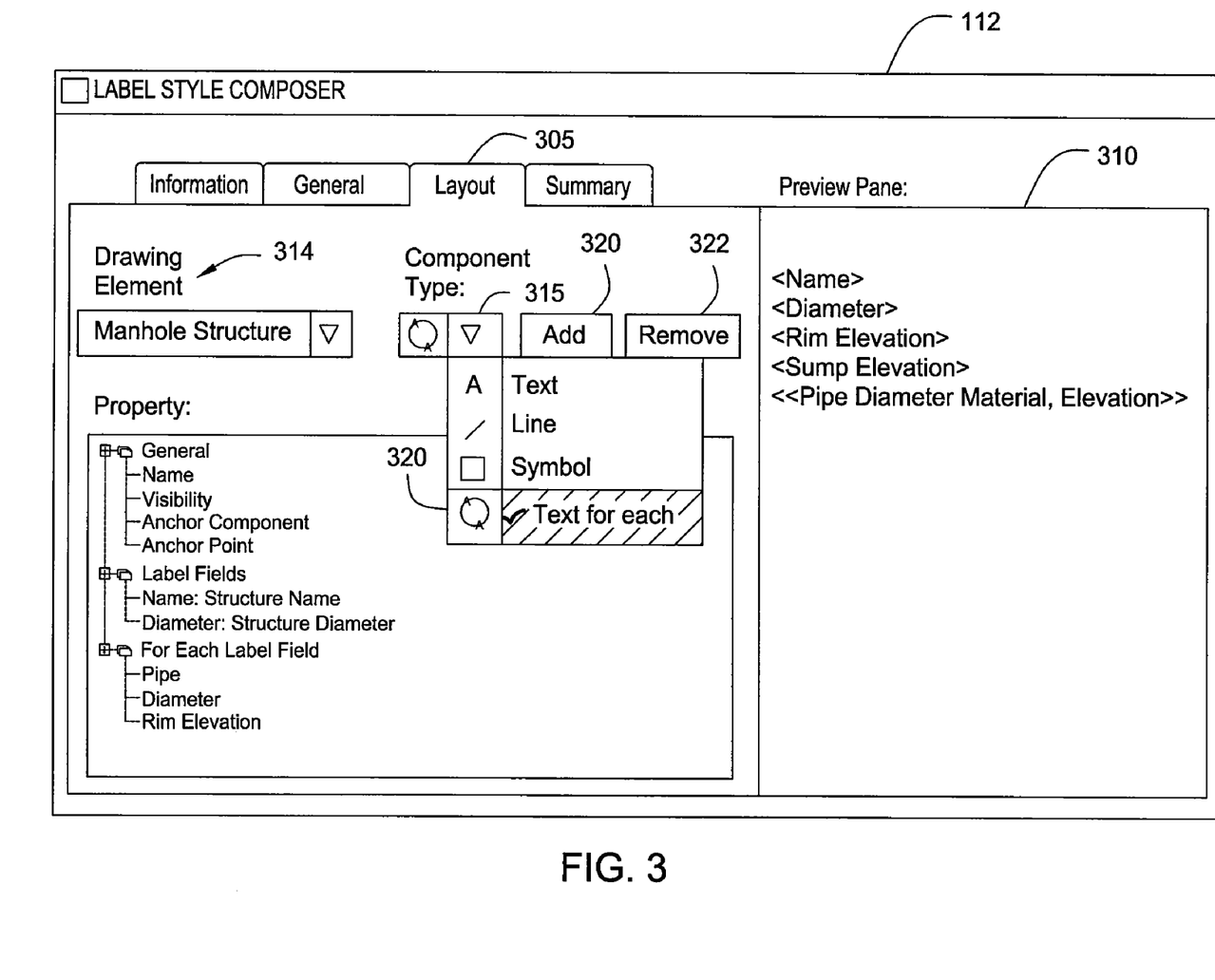
FIG. 3 illustrates a graphical user interface screen displaying a label style composer used to define label styles, according to one embodiment of the invention.

FIG. 3 illustrates label style composer 112, according to one embodiment of the invention. Label style composer 112 may be used to define label styles used for elements in CAD drawing 120. In this example, label style composer 112 includes a number of selectable tabs related to different aspects of a label style. As shown, layout tab is selected and label style composer 112 shows a layout pane 305 and a label preview pane 310. In one embodiment, layout pane 305 is used to select the different label components to include for a label for the drawing element specified in text box 314. Illustratively, label style composer 112 is being used to define a label style for a manhole structure.

Component button 315 may be used to add label components to a label style. Illustratively, menu 318 includes a text label component, a horizontal line label component, a symbol label component, and a text for-each label component, each of which may be added as a component to a label style. When a label component is added to a label style, users may also specify what content the label component should actually include when a label is generated. For example, layout pane 305 shows a list of the fields included in the label style defined for labels 210 and 215. Each field may specify an attribute of the drawing element to display in a label. Label content generated from these fields may include may include, text strings, symbols, graphical images, and the like. Buttons 320 and 322 may be used to add or remove fields from a label component.

Preview pane 310 displays the label components and the fields included in each label component for a label style as it is being defined. Illustratively, label components are shown using <and> brackets, and a for-each label component is shown using <<and>> brackets. In this example, preview pane 310 shows a label style used to generate labels 210 and 215 for structure objects 202 and 204. Accordingly, the first four lines of the label include text label components for a structure name, diameter, rim and sump elevations, and the fifth line shows the for-each label component specifying that for each pipe connected to a structure, a label should display a pipe diameter, pipe material and pipe elevation data.

In one embodiment, when a user selects to define a for-each label component for a drawing element, the label style composer 112 may be configured to prompt the user to specify which drawing elements should be included in a for-each label. For example, FIG. 4 illustrates a dialog box 400 displaying a set of selection choices for a for-each label component, according to one embodiment of the invention. As shown, the dialog box 400 allows the user to select from four different groupings of pipe objects 124 to include in a for-each label component. Illustratively, the groups include "all pipes connected to structure," "all inlet pipes connected to structure," and "all outlet pipes connected to structure." Additionally, the fourth choice may allow the user to specify a collection of specific pipes to include in a for each-label component. By selecting this option, a user may be prompted to individually select pipes to include, or may specify a condition used to include (or exclude) drawing elements from a for-each label component. For example, conditions based on pipe attributes (e.g., all pipes with a diameter over 20" or all reinforced concrete pipes) may be specified. Of course, the specific conditions may depend on the particular object being modeled, and the drawing elements available to compose CAD drawing 120.

FIG. 5 illustrates a method 500 for a user to define a label style that includes a for-each label component, according to one embodiment of the invention. Persons skilled in the art will understand that any system configured to perform the method steps shown in FIG. 5, in any order, is within the scope of the present invention.

As described above, label style composer 112 allows a user to define the layout of a label for a selected drawing element. Typically, the user specifies the particular drawing element for which a label style is being defined and then adds one or more label components to the label style. The method 500 begins at step 510 where a user selects to add a for-each label component to a label style. At steps 520 and 530, the label style composer 112 may prompt the user to specify what type of drawing elements to include in a for-each label and what information to include in a label for each for-each label element. More specifically, at step 520 the user may identify that each pipe object connected to a structure object should be included in a for-each label component. For example, as described above, dialog box 400 presents a variety of selections that a user may chose to specify which drawing elements to include in a for-each label. At step 530, the user may select the fields to use in generating a label for a for-each element. For example, the for-each label component of labels 210 and 215 include fields specifying that a pipe diameter, pipe material and pipe elevation data should be displayed in a label for each pipe connected to a manhole structure. At step 540, once the user defines the for-each label style, the label composer may save the label style as part of CAD drawing 120.

FIG. 6 illustrates a method for generating a label for a drawing element in CAD drawing 120 that includes a for-each label component, according to one embodiment of the invention. Persons skilled in the art will understand that any system configured to perform the method steps shown in FIG. 6, in any order, is within the scope of the present invention.

The method 600 begins at step 610 where the label generation component 114 retrieves a label style defined for a particular drawing element. For example, the preview pane 310 in FIG. 3 illustrates a label style defining the labels 210 and 215 for structure objects 202 and 204. In one embodiment, this label style may have been created by a user interacting with label style composer 112, according to the method 500 illustrated in FIG. 5. When the labels 210 and 215 are generated, the for-each label component displays information for each pipe object connected to structure objects 202 and 204. Labels 210 and 215 may be created initially in response to user input, such as a request to generate and display labels for structure objects 202 and 204. Once created, the labels may be updated as drawing elements reflected in the label are modified. For example, the label generation component 114 may monitor the drawing elements for any changes and update the contents of a label accordingly.

At step 620, the label generation component 114 determines the properties of the label being generated. For example, attributes such as font size or font color may be identified from the label style. In addition, label components based on properties of the drawing element in CAD drawing 120 may be determined, e.g., a part size, length, etc. At step 630, content for the label components is generated. For example, label components 255 and 270 illustrate text label components that display information about the structure objects 202 and 204 associated with labels 210 and 215.

At step 640, the label generation component 114 may be configured to determine whether the label style includes a for-each label component. If so, then at step 650, a selection of drawing elements associated with the for-each component is identified. For example, to generate labels 210 and 215, the label generation component evaluates structures 202 and 204 and determines that structure object 202 includes four connected pipe objects and that structure object 204 includes two connected pipe objects. More generally, the identification of drawing elements at step 650 may depend on what drawing elements are actually present in CAD drawing 120 and how the for-each component is defined.

At step 660, label content is generated for each element identified at step 650. For example, to generate the labels illustrated in FIG. 2, lines 260, 262, 264, and 266 are generated for label 210, and lines 272 and 274 are generated for structure 204. The content of these lines is based on the label style definition of the for-each label component. At step 670, the label may be displayed as part of CAD drawing 120. For example, the label generation component 114 may pass the label content generated at steps 630 and 660 to the label display component 116. In response, the label display component 116 may be configured to display the label on display device 115.

Advantageously, embodiments of the present invention allow users to define label styles for objects in a CAD drawing that may include one or more associated elements or objects. By including a for-each component, a label style may reflect the dynamic nature of these types of drawing elements. Thus, relative to prior art teachings, the present invention simplifies the process creating useful CAD drawing labels. For example, rather than inspecting a CAD drawing to identify a set of associated or related drawing elements and then manually composing a label, embodiments of the invention allow user to include a for-each component as part of a label style. As the properties of the drawing element change (e.g., additional elements are added or removed, or the properties of existing elements are modified) a label generation component may be configured to update the content of a label.

While the foregoing is directed to embodiments of the present invention, other and further embodiments of the invention may be devised without departing from the basic scope thereof, and the scope thereof is determined by the claims that follow.

What is claimed is:

1. A method for generating a label associated with a drawing element in a computer aided design (CAD) drawing, comprising:

receiving a selection of a first drawing element included in the CAD drawing, wherein the first drawing element is associated with a set of drawing elements included in the CAD drawing;

receiving a selection of a first drawing element type, wherein at least one drawing element in the set of drawing elements is an instance of the first drawing element type;

receiving a selection of a first attribute of the first drawing element type, wherein each instance of the first drawing element type is defined, at least in part, by a value of the first attribute;

defining a label style associated with the first drawing element, wherein the label style includes a for-each label component that specifies the first drawing element type and the first attribute;

identifying one or more drawing elements included in the set of drawing elements that are instances of the first drawing element type included in the for-each label component; and generating label content for a first label associated with the first drawing element based on the label style by determining the value of the first attribute included in the for-each label component for each drawing element included in the one or more drawing elements.

2. The method of claim 1, wherein the label content comprises text strings, symbols, or graphical images reflecting at least one property of each of the one or more instances of the drawing element type.

3. The method of claim 1, wherein the first drawing element represents a structure object in a utility network, and wherein the drawing element type represents a pipe object element type.

4. The method of claim 3, wherein the one or more drawing elements include each inlet pipe object connected to the structure object in the CAD drawing.

5. The method of claim 3, wherein the one or more drawing elements include each outlet pipe object connected to the structure object in the CAD drawing.

6. The method of claim 1, further comprising displaying the first label in the CAD drawing.

7. The method of claim 6, further comprising updating the label content for the first label displayed in the CAD drawing in response to modifications made to the CAD drawing.

8. A computer-readable medium storing instructions that when executed by a processor cause the processor to generate a label associated with a drawing element in a computer aided design (CAD) drawing, by performing the steps of:
receiving a selection of a first drawing element included in the CAD drawing, wherein the first drawing element is associated with a set of drawing elements included in the CAD drawing;
receiving a selection of a first drawing element type, wherein at least one drawing element in the set of drawing elements is an instance of the first drawing element type;
receiving a selection of a first attribute of the first drawing element type, wherein each instance of the first drawing element type is defined, at least in part, by a value of the first attribute;
defining a label style associated with the first drawing element, wherein the label style specifies a for-each label component that includes the first drawing element type and the first attribute;
identifying one or more drawing elements included in the set of drawing elements that are instances of the first drawing element type included in the for-each label component; and
generating label content for a first label associated with the first drawing element based on the label style by determining the value of the first attribute included in the for-each label component for each drawing element included in the one or more drawing elements.

9. The computer-readable medium of claim 8, wherein the label content comprises text strings, symbols, or graphical images reflecting at least one property of each of the one or more instances of the drawing element type.

10. The computer-readable medium of claim 8, wherein the first drawing element represents a structure object in a utility network, and wherein the drawing element type represents a pipe object element type.

11. The computer-readable medium of claim 10, wherein the one or more drawing elements include each inlet pipe object connected to the structure object in the CAD drawing.

12. The computer-readable medium of claim 10, wherein the one or more drawing elements include each outlet pipe object connected to the structure object in the CAD drawing.

13. The computer-readable medium of claim 8, wherein the steps further comprise displaying the first label in the CAD drawing.

14. The computer-readable medium of claim 13, further comprising updating the label content for the first label displayed in the CAD drawing in response to modifications made to the CAD drawing.

15. A computing device comprising:
a processor; and
a memory configured to store an application that includes instructions that, when executed by the processor, cause the processor to generate a label associated with a drawing element in a computer aided design (CAD) drawing, by performing the steps of:
receiving a selection of a first drawing element included in the CAD drawing, wherein the first drawing element is associated with a set of drawing elements included in the CAD drawing;
receiving a selection of a first drawing element type, wherein at least one drawing element in the set of drawing elements is an instance of the first drawing element type;
receiving a selection of a first attribute of the first drawing element type, wherein each instance of the first drawing element type is defined, at least in part, by a value of the first attribute;
defining a label style associated with the first drawing element, wherein the label style specifies a for-each label component that includes the first drawing element type and the first attribute;
identifying one or more drawing elements included in the set of drawing elements that are instances of the first drawing element type included in the for-each label component; and
generating label content for a first label associated with the first drawing element based on the label style by determining the value of the first attribute included in the for-each label component for each drawing element included in the one or more drawing elements.

16. The computing device of claim 15, wherein the label content comprises text strings, symbols, or graphical images reflecting at least one property of each of the one or more instances of the drawing element type.

17. The computing device of claim 15, wherein the first drawing element represents a structure object in a utility network, and wherein the drawing element type represents a pipe object element type.

18. The computing device of claim 15, wherein the one or more drawing elements include each drawing element in the CAD drawing that is connected to the first drawing element.

19. The computing device of claim 15, wherein the steps further comprise displaying the first label in the CAD drawing.

20. The computing device of claim 15, wherein the steps further comprise updating the label content for the first label displayed in the CAD drawing in response to modifications made to the CAD drawing.

* * * * *

UNITED STATES PATENT AND TRADEMARK OFFICE
CERTIFICATE OF CORRECTION

PATENT NO.         : 7,644,363 B2                                           Page 1 of 1
APPLICATION NO.    : 11/279216
DATED              : January 5, 2010
INVENTOR(S)        : Rogerson et al.

It is certified that error appears in the above-identified patent and that said Letters Patent is hereby corrected as shown below:

Title page, item [57] Abstract, replace "selection of attributes of the of the drawing elements" with -- selection of attributes of the drawing elements --.

Signed and Sealed this

Thirteenth Day of July, 2010

David J. Kappos
*Director of the United States Patent and Trademark Office*